United States Patent [19]

Sergeys

[11] 3,854,186

[45] Dec. 17, 1974

[54] METHOD OF PREPARING A HEAT EXCHANGER

[75] Inventor: Francis J. Sergeys, Kensington, Md.

[73] Assignee: W. R. Grace & Co., New York, N.Y.

[22] Filed: June 14, 1973

[21] Appl. No.: 370,135

[52] U.S. Cl. .................. 29/157.3 D, 165/10, 264/58
[51] Int. Cl. ....................... B21d 53/02, B23p 15/26
[58] Field of Search .................. 165/10; 264/58, 63; 29/157.3 R, 157.3 D

[56] References Cited
UNITED STATES PATENTS

| | | | |
|---|---|---|---|
| 2,552,937 | 5/1951 | Cohen | 165/10 |
| 3,112,184 | 11/1963 | Hollenbach | 165/10 UX |
| 3,176,763 | 4/1965 | Frohlich | 165/166 |
| 3,320,044 | 5/1967 | Cole et al. | 264/63 X |
| 3,444,925 | 5/1969 | Johnson | 165/166 |
| 3,725,186 | 4/1973 | Lynch | 264/58 X |

FOREIGN PATENTS OR APPLICATIONS 1,266,202  4/1968  Germany .............................. 264/63

*Primary Examiner*—Richard J. Herbst
*Assistant Examiner*—D. C. Reiley, III
*Attorney, Agent, or Firm*—Joseph P. Nigon

[57] ABSTRACT

A method of preparing a heat exchanger characterized by a series of channels positioned at 90° angles to each other is disclosed. The heat exchanger is a ceramic structure made up by preparing a mix containing a polyolefin, a ceramic filler and a plasticizer, followed by molding the material to form flat sheets. Ridges are formed on the flexible sheets in a manner such that the ridges are at 90° angles to each other. The sheets are heat-sealed to form a layer, made up of two flexible sheets. A series of these layers are then formed about a mandrel and heat-sealed. The plasticizer is extracted, the polyolefin burnt off, and the structure sintered to prepare the heat exchanger.

4 Claims, 5 Drawing Figures

METHOD OF PREPARING A HEAT EXCHANGER

BACKGROUND OF THE INVENTION

The process for preparing monolithic structures useful as supports for catalysts and absorbtion drying, separation of liquid phases, etc., have been disclosed previously. These monoliths are prepared by a process which comprises the steps of: (I) preparing a composition comprising a ceramic filler, a polyolefin material, and a plasticizer, (II) shaping the material to form a flat sheet, (III) forming ribs on the flat sheet, (IV) rolling the sheet to form areas of contact between the ribs and the web of the sheet, (V) heating prior to contact to fuse the sheet at the areas of contact, (VI) extracting the plasticizer, and (VII) firing the ceramic material which remains.

This basic concept prepares a very satisfactory monolithic structure made up of a series of rectangular channels positioned one above the other and separated by a series of web-like structures. These monolithic structures, although they are useful as supports for catalysts and other uses, have limited usefulness as heat exchangers because the channels in the structures are positioned one above the other.

BRIEF DESCRIPTION OF THE INVENTION

I have prepared a ceramic heat exchanger characterized by a structure in which there are a series of channels similar to the channels in the monolithic structure described above, except that every other channel is at a 90° angle to the channel immediately above it. Using a structure of this type, it is possible, for instance, to pass a hot gas through one set of channels and air through the set of channels positioned at 90° to the first set of channels; and to thereby effect good heat exchange between the gas streams.

My process comprises the steps of: (I) preparing a composition comprising a ceramic filler, a polyolefin material and a plasticizer, (II) shaping the material to form flat sheets, (III) forming sets of ribs on each of the sheets so that the ribs on one-half of the sheets are in one direction and the ribs on the other half of the sheets are at a 90° angle to the ribs on the first sheet, (IV) preparing a layered structure by positioning the first sheet on top of the second sheet in a manner such that the ribs on the second sheet contact the web of the first sheet and are in 90° relationship with the ribs on the first sheet, (V) heat-sealing the ribs on the first sheet to the web of the second sheet, (VI) rolling this layered structure on a mandrel in a manner such that the protruding ribs on the one section of the layer are contacted with the web of the second layer so that these ribs can be heat-sealed to the web of the layer immediately above it, (VII) cutting sections from this rolled-up structure, and (VIII) extracting the plasticizer and firing the ceramic material which remains.

DETAILED DESCRIPTION OF THE INVENTION

The invention is best visualized with reference to the drawings.

Figure 1:
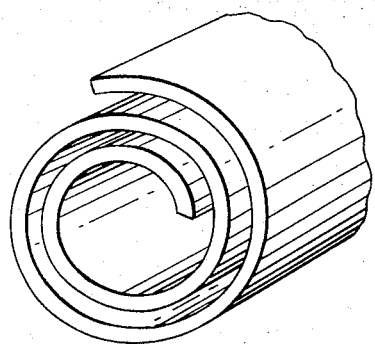
FIG. 1 shows the flexible ceramic, powder-filled, plasticized polyolefin prior to impressing ribs thereon.
Figure 2:
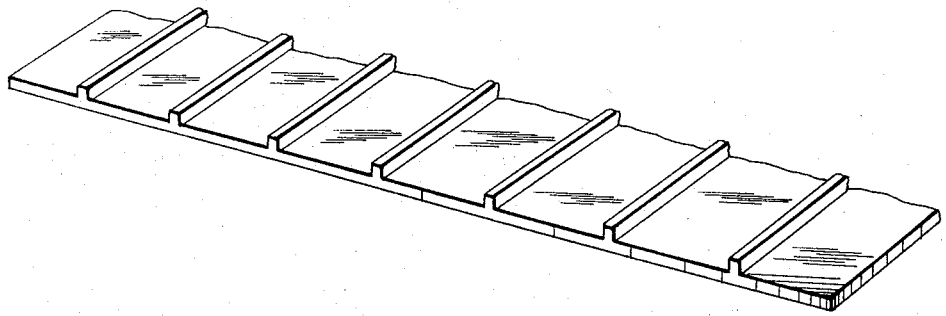
FIGS. 2 and 3 show the ceramic, powder-filled, plasticized polyolefin sheets after ribs have been impressed thereon.
Figure 3:
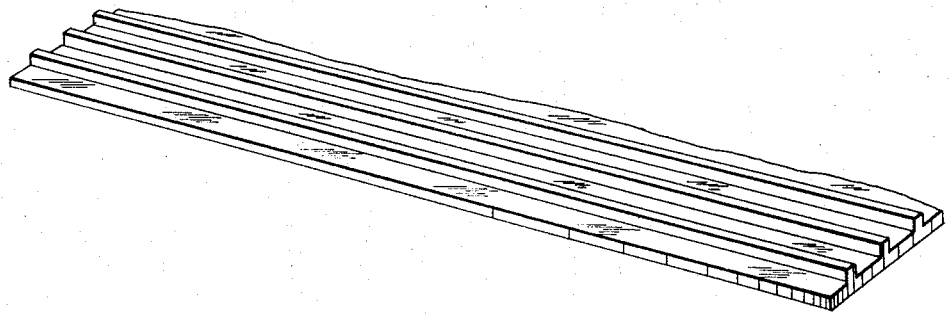
Figure 4:
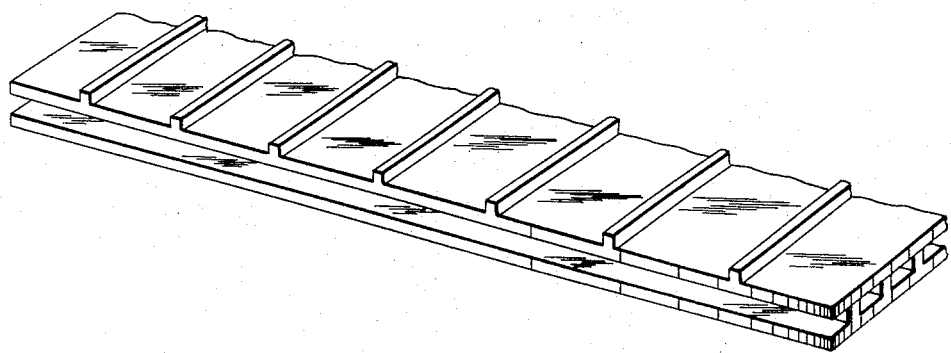
FIG. 4 shows the heat-sealed layered structure.
Figure 5:
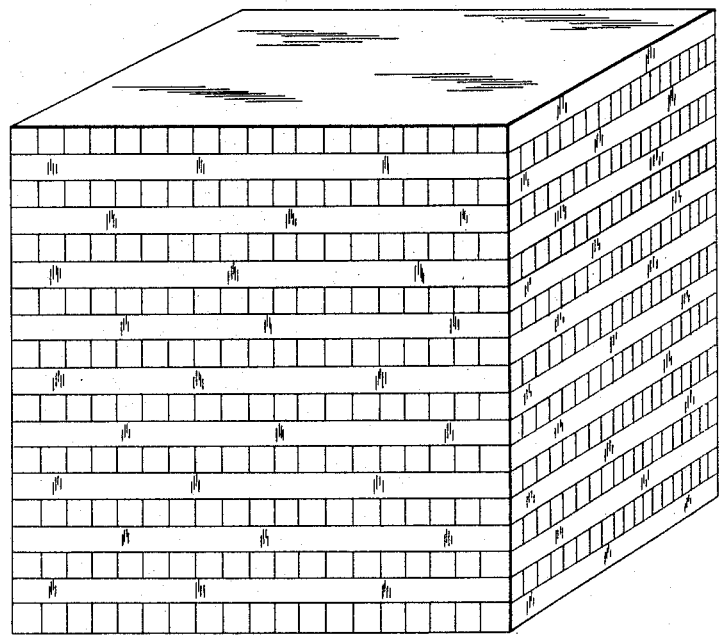
FIG. 5 shows the final heat exchange structure.

The sheets from which the layered structure is made up are prepared from a starting material comprising a ceramic powder polyolefin and a plasticizer. It is to be understood that the references made to polyolefin are generally to high molecular weight polyethylene. More specifically, a polyolefin of very high molecular weight (e.g., at least 150,000) is a good binder for ceramic powders and can tolerate high filler loadings without becoming brittle when a plasticizer is present. This is quite unlike the conventional thermoplastics, e.g., low molecular weight polyethylene for example, which have molecular weights of about 60 – 100,000. These low molecular weight polyethylenes yield brittle products at relatively low filler concentrations.

Each of the components is essential for attainment of desirable structures. The components of the composition can vary in the following amounts and still provide a workable plastic composition - polyolefin 5 – 70 percent by volume, plasticizer 15 – 80 percent by volume, and filler 15 – 80 percent by volume; or polyolefin 5 – 70 percent by weight, plasticizer 10 – 70 percent by weight, and filler 20 – 90 percent by weight. The preferred ranges are polyolefin 5 – 50 percent by volume, plasticizer 20 – 60 percent by volume, and filler 20 – 50 percent by volume. A particularly desirable mix is made up to contain:

1. 50 to 85 percent by volume, preferably 71 percent, of a ceramic powder, such as spodumene, cordierite, mullite, alumina, etc., 2. 5 to 15 percent by volume, preferably 7 percent, of a ethylene butylene copolymer having a molecular weight of about 150,000 to 1,000,000, a Melt Index of 0 and a High Load Melt Index of about 4.

3. 10 to 30 percent by volume, preferably 22 percent, of a hydrocarbon oil plasticizer. Any oil from white mineral oil to Bunker C fuel oil can be used as a plasticizer.

The finely divided ceramic materials include alumina, spodumene($LiO_2$, $Al_2O_3 \cdot 4SiO_2$), mullite ($3Al_2O_3 \cdot 4SiO_2$), magnesia-alumina, spinel and cordierite ($2MgO \cdot 2Al_2O \cdot 5SiO_2$). The components of the mix are blended together and a sheet extruded and embossed. These two process steps are most conveniently completed together. It is relatively simple to set up duplicate extrusion and embossing units where one set of sheets is embossed with grooves running in one direction and another set of sheets being embossed with grooves at a 90° angle to the grooves in the first sheet. This system provides a convenient method of preparing the layered structure since the extruded sheets from the two lines need only be laid one on top of the other and heat-sealed prior to winding.

The extrusion and embossing steps are conveniently completed together. It is of course possible to extrude the flat sheets and emboss them in separate operations; however, the economics of time and processing dictate that the two processes be done as close to simultaneously as possible.

In a typical run the sheets are made up from raw material prepared by the process described above with extruders and sheet dies. A typical extruder has a 20:1 length to diameter ratio and a 3:1 compression ratio. The sheets are extruded at temperatures of from 300° – 500°F and about 0.25 inches thick with a suitable width being from 3 inches to 40 inches or wider.

The sheets are extruded into the nips of two rolls spaced close to the die. One of the two rolls has grooves on its surface. As pointed out above the grooves in the rolls would be at 90° angles to each other in the two extruders.

The rolls are heated to 180° – 250°F and pressure is applied between the rolls causing hot plastic to flow into the grooves. The ribbed sheets are removed from the grooved roll, combined as pointed out above and heat-sealed. The effect of the rolls is to cool the sheets and solidify them sufficiently to give them enough strength to enable their removal from the grooved roll.

In the next step, the layered structure is wound on a mandrel, preferably one designed to prepare a relatively flat final structure, since square units are cut from the final wound structure.

It is convenient to heat-seal the layered structure together as they are wound on the mandrel. In a typical operation the layered structure is passed over a small roll with the ribs on the lower sheet as well as the back of the upper sheet exposed to a source of air heated to from 350° – 500°F, preferably about 400°F. This heat causes the ribs contacting the back of the sheet above to be heat-sealed to the sheet.

The heat-sealing can of course be carried out using a short contact with a flame to heat the structures to the proper temperature.

One of the characteristics of the product results in the spacing of the ribs. These ribs are spaced to provide a final product with uniform pore openings in both directions.

Following heat-sealing the plasticizer is extracted from the wound structure removed from the mandrel. The extraction can be accomplished by any solvent in which the plasticizer is soluble. For example, when the plasticizer is a hydrocarbon oil, it can be extracted with an organic solvent, such hexane, heptane, pentane, chlorinated solvents such as carbon tetrachloride, trichlorethylene, and perchlorethylene, for example. Other organic solvents such as petroleum ether and diethylether can also be used. When the plasticizer is a water soluble compound, the plasticizer can be extracted with water.

After the plasticizer has been extracted, units having the dimensions of the final device are cut from the large structure removed from the mandrel. This is accomplished using any suitable cutting device. The structure is relatively soft and can be cut with relative ease.

It is preferred to cut the structures in the final shape at this point rather than after firing, since it eliminates breakage problems caused by cutting a ceramic structure.

The devices in the final shape of the final heat exchanger are then heated to above the degradation temperature of the thermoplastic so as to completely burn off the polyolefin. The degradation temperature will, of course, vary with the choice of polyolefin. With a high viscosity linear polyethylene, I prefer to use a temperature in the range of at least 240°–260°C to initiate degradation. At a temperature of about 240°C (when polytheylene is the polyolefin) the structure begins to turn black and at about 700°C the structure begins to turn white, indicating that the thermoplastic has entirely burned off. When the thermoplastic is completely burned off, the temperature is increased to that at which the filler used in the preparation of the heat exchanger sinters. When using the preferred ceramic powder spodumene, for example, a temperature of about 1,300°–1,500°C is recommended. The temperature is held at the sintering point for about 2 hours and then the structure is allowed to cool slowly to room temperature. The cooling time is generally about 3–4 hours.

The final heat exchange structure appears identical in shape to the structure as cut in the previous step, except that a slight linear shrinkage of 2–5 percent takes place.

My invention is illustrated by the following specific but not limiting examples.

EXAMPLE 1

A composition was prepared by admixing 8.6 grams of particle form polyethylene, 76.8 grams of the spodumene and 28.8 grams of a mineral oil containing approximately 80 percent saturates. The components were mixed in a commercially available Brabender Plastograph heated to 170°C. The composition was extruded and pressed into 12 mil sheets in a hydraulic press with 20 tons force. Ribs were then pressed on two separate webs of the material with one set of ribs in 180° relationship to the second set of ribs. The ribs were about 20 mils wide and 30 mils high and spaced ⅛ inch apart. From the ribbed sheet, strips were cut 2 inches wide by 8 inches long and were positioned one on top of the other and heat-sealed at their points of contact. The resulting layered structure was rolled up with the ribs protruding from the top of the layered structure in the direction of the axis of the roll. The resulting structure was heat-sealed by heating to temperatures of about 400° F; the heat-sealed structure was then cooled and immersed in hexane for 30 minutes to extract substantially all the mineral oil.

A square structure was cut from this roll, dried and heated in an oxidizing atmosphere, first to about 250°C (over a period of 3 hours). When degradation began as evidenced by the black color of the structure, the temperature was slowly increased and about 2 hours later at about 700°C the structure turned white indicating the burn off of the polyethylene was complete. The temperature was slowly increased and about 2 hours later the temperature reached 1,450°C where it was held for about 2 hours to sinter the remaining ceramic powder. The structure was cooled over a period of about 4 hours.

What is claimed is:

1. A process for preparing a heat exchanger which comprises the steps of:
    a. Preparing a mixture containing 30–85 percent of a ceramic powder, 5–20 percent of an olefinic polymer having a molecular weight of about 150,000 to 2,000,000, and 10–50 percent of a plasticizer,
    b. compounding the mixture by heating to about 300°–555°F with working until a uniform composition results, extruding said composition as a flat sheet and embossing to form a series of ribs thereon,
    c. Positioning one of the sheets on top of the other in a manner such that the ribs of the lower sheet contact the back of the upper sheet, and that the ribs are in 90° relationship to each other,
    d. Heat-sealing the ribs of the lower sheet to the back of the upper sheet to form a layered structure, e. Heating the surfaces of the layered structure to about 350°–500°F and winding the structure about a mandrel thus forming a bonded structure,
f. Cutting structures in the desired shape from said bonded structure and extracting the plasticizer therefrom,
g. Heating to about 240°–700°C to burn out the polyolefin and sintering to a temperature of 1,300°–1,400°C for about 2–6 hours,
h. Cooling and recovering the heat exchanger structure.

2. The process according to claim 1 wherein the ceramic filler is selected from the group consisting of spodumene corderite, millite, magnesia-alumina, spinel and alumina.

3. The process according to claim 1 wherein the plasticizer is mineral oil and is extracted from the structures by contacting said structure with a solvent selected from the group consisting of hexane, heptane, pentane, chlorinated organic solvents, and low boiling ethers.

4. The process according to claim 1 wherein the polyolefin is high density polyethylene.

* * * * *